United States Patent
Sathya et al.

(10) Patent No.: US 10,743,234 B2
(45) Date of Patent: Aug. 11, 2020

(54) PROXIMITY-BASED MESSAGING PROTOCOL

(71) Applicant: Facebook, Inc., Menlo Park, CA (US)

(72) Inventors: Sai Sri Sathya, Tamil Nadu (IN); Ramesh Raskar, Palo Alto, CA (US); Mayank Raj, Seattle, WA (US); Pritesh Sankhe, Maharashtra (IN)

(73) Assignee: Facebook, Inc., Manlo Park, CA (US)

( * ) Notice: Subject to any disclaimer, the term of this patent is extended or adjusted under 35 U.S.C. 154(b) by 81 days.

(21) Appl. No.: 15/863,325

(22) Filed: Jan. 5, 2018

(65) Prior Publication Data

US 2019/0215753 A1    Jul. 11, 2019

(51) Int. Cl.

| | |
|---|---|
| *H04L 12/28* | (2006.01) |
| *H04W 40/10* | (2009.01) |
| *G06Q 50/00* | (2012.01) |
| *H04W 84/18* | (2009.01) |
| *H04W 40/20* | (2009.01) |
| *H04W 88/04* | (2009.01) |
| *H04L 29/08* | (2006.01) |
| *H04W 40/02* | (2009.01) |

(52) U.S. Cl.
CPC .......... *H04W 40/10* (2013.01); *G06Q 50/01* (2013.01); *H04L 67/306* (2013.01); *H04W 40/026* (2013.01); *H04W 40/20* (2013.01); *H04W 84/18* (2013.01); *H04W 88/04* (2013.01)

(58) Field of Classification Search
CPC ..... H04W 40/10; H04W 40/20; H04W 84/18; H04W 88/04; H04L 67/306
See application file for complete search history.

(56) References Cited

U.S. PATENT DOCUMENTS

| | | | | |
|---|---|---|---|---|
| 8,665,841 | B1* | 3/2014 | Goel ........................ | H04L 69/22 370/327 |
| 9,363,651 | B1* | 6/2016 | daCosta ................... | H04W 4/14 |
| 9,438,691 | B1* | 9/2016 | Andrews ................ | H04L 67/306 |
| 10,110,439 | B2* | 10/2018 | Haines ................... | H04L 41/145 |
| 2007/0038743 | A1* | 2/2007 | Hellhake ........... | H04L 29/12283 709/224 |
| 2008/0112422 | A1* | 5/2008 | Jetcheva ................. | H04L 45/04 370/406 |
| 2010/0232317 | A1* | 9/2010 | Jing ..................... | H04L 41/0853 370/254 |
| 2015/0081884 | A1* | 3/2015 | Maguire ................. | H04L 45/70 709/224 |
| 2016/0379282 | A1* | 12/2016 | Hill ........................ | G06Q 50/01 705/26.1 |
| 2017/0093687 | A1* | 3/2017 | Wu ........................ | H04L 45/122 |

(Continued)

*Primary Examiner* — Guang W Li
(74) *Attorney, Agent, or Firm* — Baker Botts L.L.P.

(57) ABSTRACT

In one embodiment, a method includes receiving, from a sender node associated with a mesh network, a request to send a message to one or more recipient nodes, the wireless mesh network comprising a plurality of nodes, detecting a triggering condition associated with the wireless mesh network, predicting a routing path from the sender node to each of the one or more recipient nodes via the wireless mesh network through one or more relay nodes of the plurality of nodes based on proximity information and network information associated with the mesh network, and sending the message to the one or more recipient nodes via the one or more relay nodes of the wireless mesh network.

23 Claims, 8 Drawing Sheets

(56) References Cited

U.S. PATENT DOCUMENTS

| | | | |
|---|---|---|---|
| 2017/0135609 A1* | 5/2017 | Eckblad | A63B 69/32 |
| 2017/0237702 A1* | 8/2017 | Karimli | H04L 65/1073 |
| | | | 709/206 |
| 2017/0334522 A1* | 11/2017 | Zahid | B62M 25/08 |
| 2018/0032997 A1* | 2/2018 | Gordon | G06Q 20/3224 |
| 2018/0198701 A1* | 7/2018 | Kosugi | H04W 40/02 |
| 2018/0249535 A1* | 8/2018 | Seo | H04W 48/18 |
| 2018/0262928 A1* | 9/2018 | Lewis | H04W 24/04 |
| 2019/0174011 A1* | 6/2019 | Jabara | H04M 15/8055 |
| 2019/0215753 A1* | 7/2019 | Sathya | G06Q 50/01 |

\* cited by examiner

PROXIMITY-BASED MESSAGING PROTOCOL

TECHNICAL FIELD

This disclosure generally relates to a method for delivering digital messages within a wireless mesh network.

BACKGROUND

Individuals and businesses often depend on the Internet for communication. However, users may frequently find themselves in under-connected environment where Internet may not be available, but nonetheless still want to communicate with other users. In these situations, users may turn to offline methods of communication in order to send and receive messages to and from other users.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The present invention is a system and method for delivering digital messages within a wireless mesh network in an efficient way. In particular embodiments, a wireless mesh network is formed when a triggering condition is met. The triggering condition may be a situation where no network infrastructure is accessible for a number of wireless nodes that are in proximity to each other, or a situation where routing digital messages between participating nodes without going through the Internet is more efficient because the participants are gathered in a small area. In particular embodiments, two main delivery modes may be available in the mesh network. As an example and not by way of limitation, in a peer-to-peer mode, a sender may transmit messages to one or more receivers over a wireless channel. As another example and not by way of limitation, in a multi-hop mode, the messages may be relayed through one or more interim nodes between the sender and the receiver because at least one of the intended receivers is not within the transmission range of the sender. When a message is routed from the sender to the receiver, the nodes in the mesh network may make decisions to deliver the message to the receiver in an efficient way. As an example and not by way of limitation, mobile phone users on an airplane may form a wireless mesh network during the flight and exchange messages between them. When a user at the front of the plane wants to send a message to a user at the back of the plane, the receiver may be out of transmission range from the sender. One or more mobile devices in between the sender and the receiver may relay the message. In particular embodiments, the mobile devices including the sender node and the relay nodes may consider a proximity information, network information, and/or client device information while those devices are making decisions how to route the message in an efficient way.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
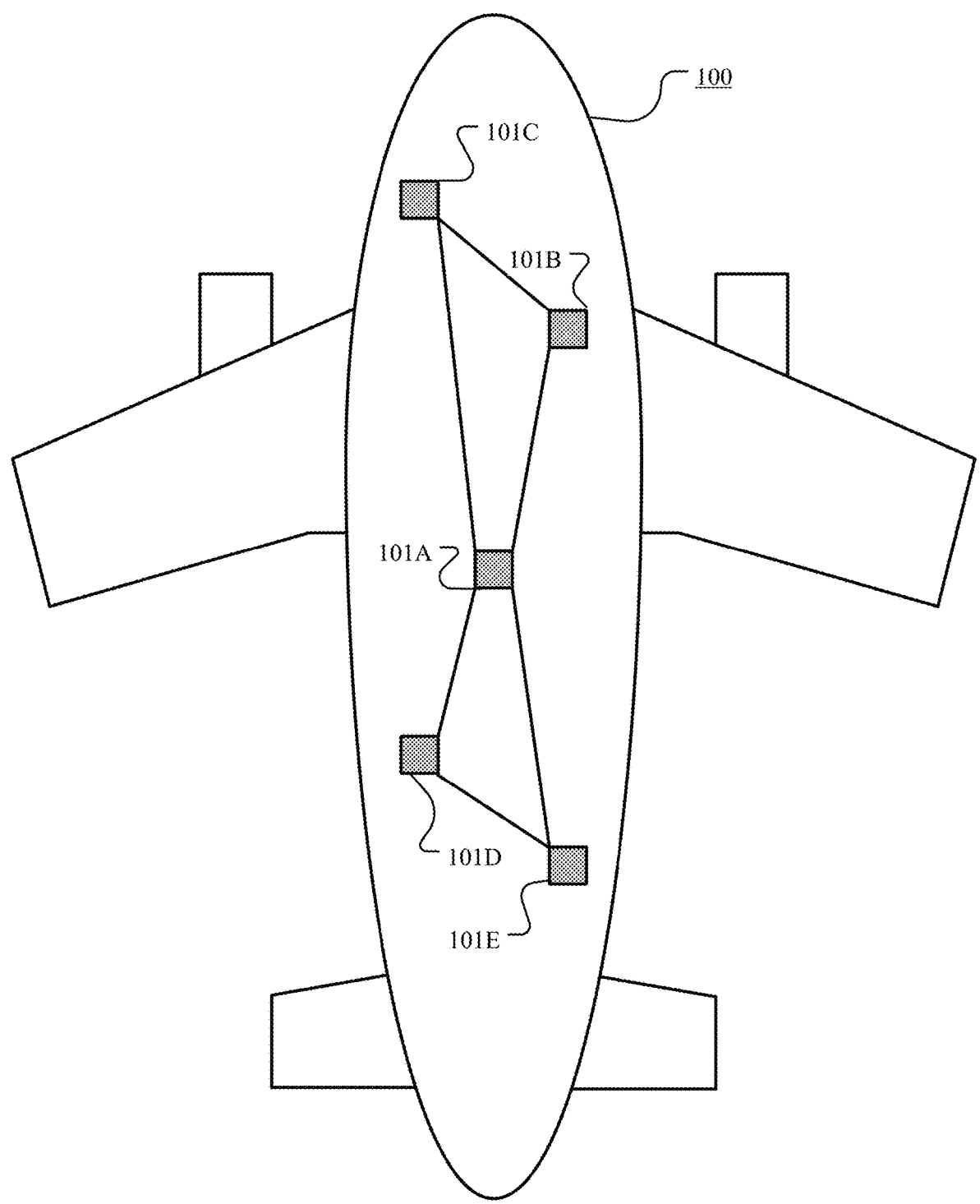
FIG. 1 illustrates an example offline wireless mesh network.

The present invention is a system and method for delivering digital messages within a wireless mesh network in an efficient way. In particular embodiments, a plurality of users located in proximity to each other may want to communicate with each other in a situation where no internet network infrastructure is accessible for them. As such, the plurality of users may use an offline communication session to communicate with each other, which may be facilitated by being located in close proximity to each other. FIG. 1 illustrates an example offline wireless mesh network 100 (e.g., in the situation of a plurality of users on an airplane). In particular embodiments, when a first computing device 101A is triggered to initiate an offline communication session, the first computing device 101A may discover other computing devices in proximity to the first computing device 101A (e.g., computing devices 101B, 101C, 101D, and 101E) using a discovery protocol. After the first computing device 101A discovers a second computing device 101B, the first computing device 101A may initiate communications with the second computing device 101B after one or more predetermined conditions for the second computing device 101B are met (e.g., as determined based on an amount of communications, amount of time within the vicinity of each other, etc.). The one or more predetermined conditions for the communications may be a parameter associated with the offline communication session. As an example and not by way of limitation, a first user with a mobile phone may get on an airplane and switch the mobile phone to the airplane mode in which wireless transceivers are turned off. The first user may establish an offline messaging session with the other users on the plane by turning, for example, the WIFI and/or the Bluetooth radio on. For the offline messaging session, the mobile phone may discover the other WIFI and/or Bluetooth enabled mobile devices and determine a communication score for each discovered mobile device, as discussed below. The first user may be able to send messages to a second user if a communication score for the second user's device is higher than a threshold for transmissions, as discussed below. In addition, the first user may be able to receive messages from the second user if the communication score for the second user's device is higher than a second threshold.

In particular embodiments, a number of wireless technologies may be available on a typical wireless device. In particular embodiments, the mesh network may comprise nodes with various wireless technologies. As an example and not by way of limitation, transmission range and power consumption per message transmission may rely significantly on the type of wireless technology used. For example, WIFI signals travel considerably further than Bluetooth signals or Bluetooth Low Energy (BLE) signals, but WIFI consumes significantly higher energy for a message transmission than Bluetooth or BLE. When a node is transmitting a message or relaying a message via the best multi-hop route, the node may consider at least the available technology of the wireless mobile device associated with the potential nodes, current battery status of the potential nodes, type of the potential nodes, message type, message size to choose the most efficient and effective wireless offline technology to use for the transmission. In particular embodiments, the node may change and/or update the state of the wireless technology on the fly as needed to accommodate the multi-hop route.

In particular embodiments, in the example shown in FIG. 1, the first computing device 101A may be capable of accessing more than one wireless network simultaneously. The first computing device 101A, during a communication session, may use more than one wireless networks for communications. The first computing device 101A may communicate with a second computing device 101B over the Bluetooth network while communicating with a third computing device 101C over the Wi-Fi network. Because the first computing device 101A is a mobile device, the first computing device 101A may have at least one wireless transceiver. Like most contemporary mobile devices, the first computing device 101A may have one or more sensors that can capture physical interactions of the users. As an example and not by way of limitation, the first computing device 101A may be a smartphone equipped with a cellular radio transceiver, a Wi-Fi radio transceiver, and a Bluetooth radio transceiver. The first computing device 101A may communicate with multiple communication peers through different wireless networks simultaneously.

In particular embodiments, a first mobile computing device associated with a first user may detect a triggering event for an offline communication session. In the offline communication session, the first mobile computing device may exchange messages with one or more mobile computing devices without routing the messages through the Internet. In particular embodiments, the triggering event may include detecting by a mobile device that no network infrastructure (e.g., the Internet) is reachable and/or accessible. In particular embodiments, the triggering event may include detecting by a mobile device that all the communication participants (e.g., the plurality of mobile devices) for the communication session have one or more communication paths with each other over one or more wireless networks without accessing any network infrastructure. In particular embodiments, the triggering event may include detecting by a mobile device that routing digital messages between the communication participants (e.g., the plurality of mobile devices) without going through the Internet (e.g., by going through Bluetooth, WIFI, etc.) is more efficient because the users are gathered in a small area and located within a predetermined distance from each other. As an example and not by way of limitation, the mobile device may determine that routing messages through the wireless networks is more efficient when the users are with a distance where messages may be sent via Bluetooth, WIFI, or other suitable wireless network more quickly and/or efficiently than over the Internet. This may be based on the users being within distance of sending messages via Bluetooth, WIFI, or other suitable wireless network, in addition to other conditions such as the size of the message, the type of the message, the load on the Internet network infrastructure compared with the wireless network infrastructure, other relevant conditions, and any combination thereof. The first computing device 101A may discover one or more computing devices 101B, 101C, 101D, 101E associated with one or more second users that have one or more communication paths to the first computing device 101A over one or more wireless networks using a wireless discovery protocol (e.g., a Bluetooth Low Energy (BLE) discovery protocol, a WIFI discovery protocol, etc.). In order to find the one or more second computing devices 101B, 101C, 101D, 101E, the first computing device 101A may discover using a discovery protocol any computing device that has one or more communication paths to the first computing device 101A over one or more offline wireless networks without accessing any network infrastructure (e.g., the Internet). In particular embodiments, the first computing device 101A may discover only a computing device that expresses interest in communicating with the first computing device 101A for a particular condition and/or on a particular topic among the computing devices that have one or more communication paths to the first computing device 101A over one or more wireless networks without accessing any network infrastructure.

In particular embodiments, the computing devices 101A, 101B, 101C, 101D, 101E may each be associated with a node in the wireless mesh network. In particular embodiments, when a participating node makes a routing decision regarding the routing of a message from the participating node to another node of the wireless mesh network, the participating node considers a distance between each of two nodes and a plurality of network and computing device information to determine a communication score that may impact how a message is delivered between the participating node and the other nodes of the wireless mesh network. Exemplary network information may include the delivery mode available via the mesh network. In particular embodiments, two delivery modes may be available via the mesh network. As an example and not by way of limitation, in a peer-to-peer mode, a sender computing device (e.g., a sender node) transmits messages to one or more recipient computing devices (e.g., one or more recipient nodes) over the wireless mesh network. Only intended recipient computing devices may decode the payload of the message and pass the payload of the message to the user associated with the recipient computing device. As another example and not by way of limitation, in a multi-hop mode, the messages may be relayed through one or more intermediary nodes between a sender computing device (e.g., a sender node) and one or more recipient computing devices (e.g., one or more recipient nodes). In particular embodiments, the multi-hop mode may be selected because at least one of the intended recipient computing devices is not within a transmission range (e.g., the transmission distance) of the sender. As an example and not by way of limitation, the transmission distance may be the distance at which messages may be directly from the sender node to the recipient node via Bluetooth, WIFI, other suitable wireless network, or any combination thereof. When a message is routed from the sender computing device to the recipient computing device, each of the nodes in the mesh network makes one or more decisions to deliver the message to the recipient computing device in an efficient way. As an example and not by way of limitation, the most efficient way may be the fastest path from the sender node to the recipient node. As another example and not by way of limitation, the most efficient way may be the path requiring the least amount of network resources. As yet another example and not by way of limitation, the most efficient way may be the path requiring the fewest intermediary routing nodes.

In particular embodiments, because nodes are mobile, the topology of the mesh network may be constantly changing. In order to get a better view of the current topology of the network, the nodes may be required to exchange command messages more frequently with a computing system (e.g., the social-networking system). The amount of updates to the topology of the mesh network from the updates of these command messages may result in lower network performance and lower network efficiency because command messages leave less available bandwidth for the user messages. A participating node may adjust frequency of the command message based on network parameters including performance, reliability and efficiency. As an example and not by way of limitation, when network reliability is higher than a threshold, the node may reduce the frequency of the command messages. As another example and not by way of limitation, when the node observes that reliability measures are low, the node may increase the number of command messages. In particular embodiments, exemplary network information may also include performance factors such as the amount of time required to update (e.g., add, delete, move) a node in the wireless mesh network. Participating nodes may correspond to one or more users that may be in constant movement that may move them into and out of range at any given time. The location of a node in real time may impact a sender node's decision of which nodes may be used as relay nodes. In addition, the performance factors may include a latency period associated with any of the viable routing paths via the nodes of the wireless mesh network. As an example and not by way of limitation, if there are any known or later determined latencies associated with any of the nodes, those nodes may not be included in the determination of a routing path. In particular embodiments, exemplary network information may include a reliability associated with a node. As an example and not by way of limitation, the reliability of a node may be determined based on percentage of message drops by the node previously, percentage of node drops by the node previously, other relevant reliability factors, and any combination thereof. In particular embodiments, exemplary network information may include an efficiency associated with a node. As an example and not by way of limitation, the efficiency of a node may be determined based on a percentage routing data exchanged (e.g., where the node is a relay node) compared to a percentage payload data (e.g., where the node is a recipient node), an optimization of a message route (based on a fastest path, least amount of resources used, fewest intermediary routing nodes, etc., as discussed above), and a power usage for each viable routing path, other relevant factors, and any combination thereof.

In particular embodiments, mobile devices users of the computing devices 101A, 101B, 101C, 101D, 101E on an airplane as shown in FIG. 1 may form a wireless mesh network during the flight and exchange messages between them. When a user at the middle of the plane (e.g., computing device 101A) wants to send a message to a user at the back of the plane (e.g., computing device 101E), the recipient computing device may be out of wireless network transmission range from the sender computing device. In particular embodiments, one or more mobile devices (e.g., computing device 101D) in between the sender computing device and the recipient computing device (e.g., as intermediary routing nodes) may relay the message. In addition to the network information discussed above, a computing device (e.g., associated with a social-networking system) may consider a plurality of information associated with each of the computing devices to determine how to route a message in an efficient way from the sender computing device (e.g., 101A) through the intermediary routing node (e.g., computing device 101D) to the recipient node (e.g., 101E). In particular embodiments, the first computing device 101A (e.g., as one node in the wireless mesh network) may determine which of computing devices 101B, 101C, 101D, 101E (e.g., as other nodes in the wireless mesh network) may be available for communication by determining a communication score associated with second computing devices 101B, 101C, 101D, 101E. In particular embodiments, when a participating node (e.g., a sender node or one or more intermediary nodes) makes a routing decision to deliver one or more messages, the participating node may consider a plurality of network information that may impact the delivery of the messages. As an example and not by way of limitation, the network information may be collected by the sender computing device (e.g., 101C) and the intermediary routing nodes (e.g., computing devices 101B, 101A, 101D). As an example and not by way of limitation, the communication score may be determined based on computing device information such as previous communications between two computing devices, including a number of previous communications, a duration of time of previous communications, a geographic distance between the two computing devices (e.g., which may be determined real time, at particular time intervals, etc.), a history of geographic distance between the two computing devices (e.g., a history of the two computing devices being in proximity of each other), and other suitable information associated with the computing devices.

In particular embodiments, the communication score may be determined based on social graph information associated with a social-networking system. The social-networking system may predict a wireless mesh network between users based on social graph information when the participating users are connected in the social graph. In particular embodiments, when a node makes a routing decision, the node may consider information already gathered by the node from the mesh network. As an example and not by way of limitation, the node make consider information including results of computations/calculation (e.g., associated with the mesh network), information linked with the message (e.g., high priority, size of message, etc.), other suitable information, and any combination thereof. A routing decision may also be based on non-network information. For example, when a user sends a message to all of her family members, the wireless node of the user may try to route the message through as many family members as possible (e.g., as determined via the social graph associated with the social-networking system). In particular embodiments, the social graph information may include affinity, historical information, common interests between users, other relevant information, or any combination thereof. The social-networking system may also determine current locations of the users. In particular embodiments, the wireless mesh network may be formed at a regular interval. As an example and not by way of limitation, a participating node may predict a recurring pattern based on history information, network information, client device information, other relevant information, or any combination thereof. As another example and not by way of limitation, the participating node may predict the advent of a mesh network based on additional data sources including calendar, events, or any other meta-data acquired while the node is connected to the Internet. In particular embodiments, the social-networking system may predict a wireless mesh network, both recurring and non-recurring, between users based on social graph information when the participating users are connected in the social graph. In particular embodiments, the social-networking system may be able to predict a formation of mesh network between users in advance. When the social-networking system predicts a mesh network, the social-networking system may inform the potential formation of the mesh network to the devices associated with the participating users. As an example and not by way of limitation, when a sender node has a message to be sent to a recipient/destination node and the sender node predicts a mesh network including both the sender node and the recipient node in a near future and, the sender node may delay the delivery of the message until the mesh network becomes available if the sender node determines that delaying the delivery may result in a more efficient and/or reliable message delivery.

In particular embodiments, the first computing device 101A may discover a second computing device 101B associated with a second user in proximity using a wireless discovery protocol such as a Bluetooth Low Energy (BLE) discovery protocol. The first computing device 101A may discover the second computing device 101B to establish an offline communication session. In particular embodiments, the first computing device 101A may discover the second computing device 101B in proximity even when establishing an online communication session. In particular embodiments, both the first computing device 101A and the second computing device 101B may be the client systems 630 of an online social network. In such a situation, the first computing device 101A may receive an indication from the social-networking system 660 that the second computing device 101B is in proximity. The indication from the social-networking system 660 may include additional information associated with the second user and the second computing device 101B. The first computing device 101A may discover any computing device in proximity. In particular embodiments, the first computing device 101A may discover only computing devices in proximity that express interests in communicating with the first computing device 101A on a particular topic. As an example and not by way of limitation, illustrated in FIG. 1, the first computing device 101A may discover computing devices in proximity using a BLE discovery protocol. The first computing device 101A may discover only computing devices expressing interests in communicating with the first computing device 101A on football games. As another example and not by way of limitation, the first computing device 101A may discover computing devices in proximity using a BLE discovery protocol because the first computing device 101A detects that the Internet is not accessible. Because this situation may be related with a disaster or an emergency situation, the first computing device 101A may discover any computing device in proximity. As yet another example and not by way of limitation, a first user associated with a first computing device 101A may enter a coffee shop. The first user may want to chat about coffee while he is waiting for his friends. The first computing device 101A may send a request to the social-networking system 660. The social-networking system 660 may send a response including a list of the online social network users in the coffee shop who are interested in coffee. The first computing device 101A may send invitations to the users identified in the response message. Although this disclosure describes discovering a communication peer in a particular manner, this disclosure contemplates discovering a communication peer in any suitable manner.

In particular embodiments, particular network information may be included in the messages themselves. In particular embodiments, the sender computing device (e.g., 101C) and the intermediary routing nodes (e.g., computing devices 101B, 101A, 101D) may collect particular information and learn certain information while the nodes are connected to the Internet (e.g., the information discussed above or any other relevant information). In addition, upper layer information, such as user identities of the nodes (i.e., friends or family as determined via the social graph information), may be used when the sender computing device (e.g., 101C) and the intermediary routing nodes (e.g., computing devices 101B, 101A, 101D) make routing decisions. In particular embodiments, these participating nodes may share the collected and/or computed information (e.g., the information discussed above or any other relevant information) with other nodes in the mesh network to keep network efficiency high. As an example and not by way of limitation, network information may include a type and size of a message. Message types may include a text message, multimedia message, commands and control messages, or any combination thereof. Of these message types, for example, commands may be delivered more reliably while multimedia messages may be delay sensitive based on the nature of the message. Also, a large message generally should be delivered over a reliable route because the retransmission cost of a large message is high. As another example and not by way of limitation, network information may also include information on type of nodes in the mesh network. Some nodes may be nodes associated with users (i.e., user devices) while some other nodes may be intermediary relay nodes (e.g., which may be a user device or non-user device). As an example and not by way of limitation, an intermediary relay node that is a non-user device may be plugged-in, and thus energy consumption may be less critical than that of user devices. Also, an intermediary relay node that is a non-user device may have longer transmission range due to the nodes having stronger transmission signal power. In particular embodiments, network information may include messaging time such as time of the day, day of the month, month of the year, etc. In particular embodiments, particular mesh networks may be recurring with a particular recurring pattern (e.g., a set of nodes that routinely occur). As an example and not by way of limitation, a university class may include a mesh network with a particular recurring pattern of user nodes and non-user nodes for a particular time period (e.g., a semester, a year, etc.). In particular embodiments, the sender computing device and/or the intermediary routing node may delay the delivery of a message based on information associated with the recurring pattern of a particular mesh network. As an example and not by way of limitation, a node may delay the delivery of a message based on messaging time if the messaging time is close to the beginning of a recurring mesh network. In particular embodiments, the network information that can used when the node makes a routing decision may also include a number of participating nodes for the entire mesh network, nodes distribution around a node, and destination span including number of destination nodes, any other relevant node information, and any combination thereof.

In particular embodiments, the first computing device 101A may determine a message to be sent to the second computing device 101B and notify a computing device (e.g., a device associated with a social-networking system). The computing device may detect a triggering condition associated with the wireless mesh network and request that the message be sent over an offline communication session (e.g, via Bluetooth, WIFI, other suitable offline network, or any combination thereof). The computing may then predict a routing path from the first computing device 101A (e.g., the sender node) to the second computing device 101B (e.g., the recipient node) via the wireless mesh network through one or more relay nodes of the plurality of nodes associated with the wireless mesh network. In particular embodiments, the routing path may be determined based on proximity information and network information associated with the mesh network. In particular embodiments, the proximity information may include geographic distance information. Once a routing path is predicted, the computing device may send the message from the first computing device 101A to the second computing device 101B via the routing path through the one or more relay nodes. In particular embodiments, the network information may also include an identifier of an offline communication session that the message belongs to, an identifier of a sender node, one or more identifiers that identify one or more intended recipient nodes, and a payload. The computing device (e.g., associated with the social-networking system) may determine that the second computing device 101B is the intended recipient node (or a part of the one or more intended recipient nodes) based on the one or more identifiers.

In particular embodiments, due to the broadcast nature of wireless communications, the computing device (e.g., associated with the social-networking system) may require extra consideration for security purposes. As an example and not by way of limitation, the messages may be end-to-end (E2E) encrypted. In particular embodiments, participating nodes may not transmit information that can reveal the identity of the user associated with the mobile device of the participating node. In the situation where an identity is transmitted upon consent, the transmitted identity may be non-refutable.

Figure 2A:
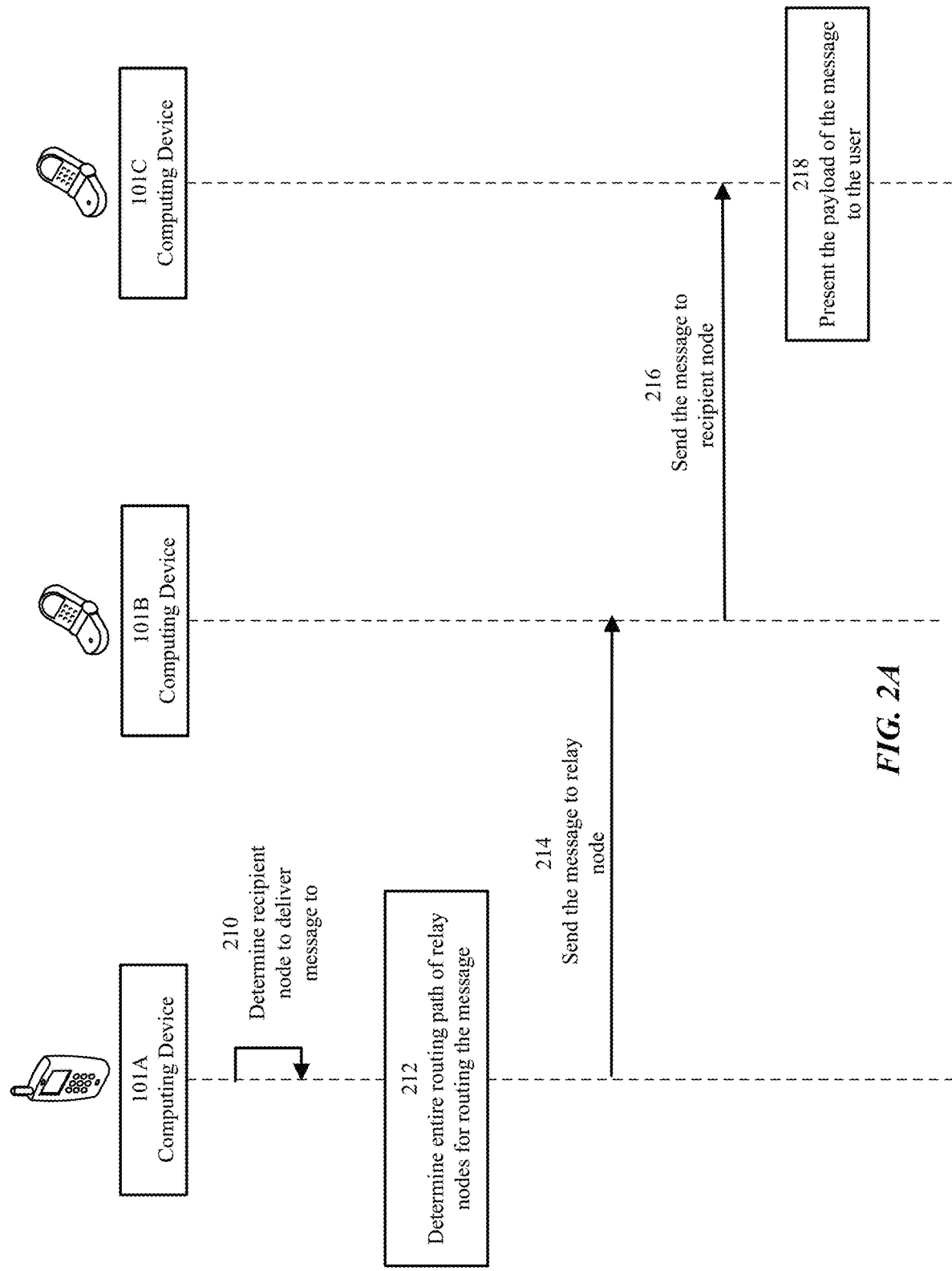
FIGS. 2A and 2B illustrate example flows for using the offline wireless mesh network.
Figure 2B:
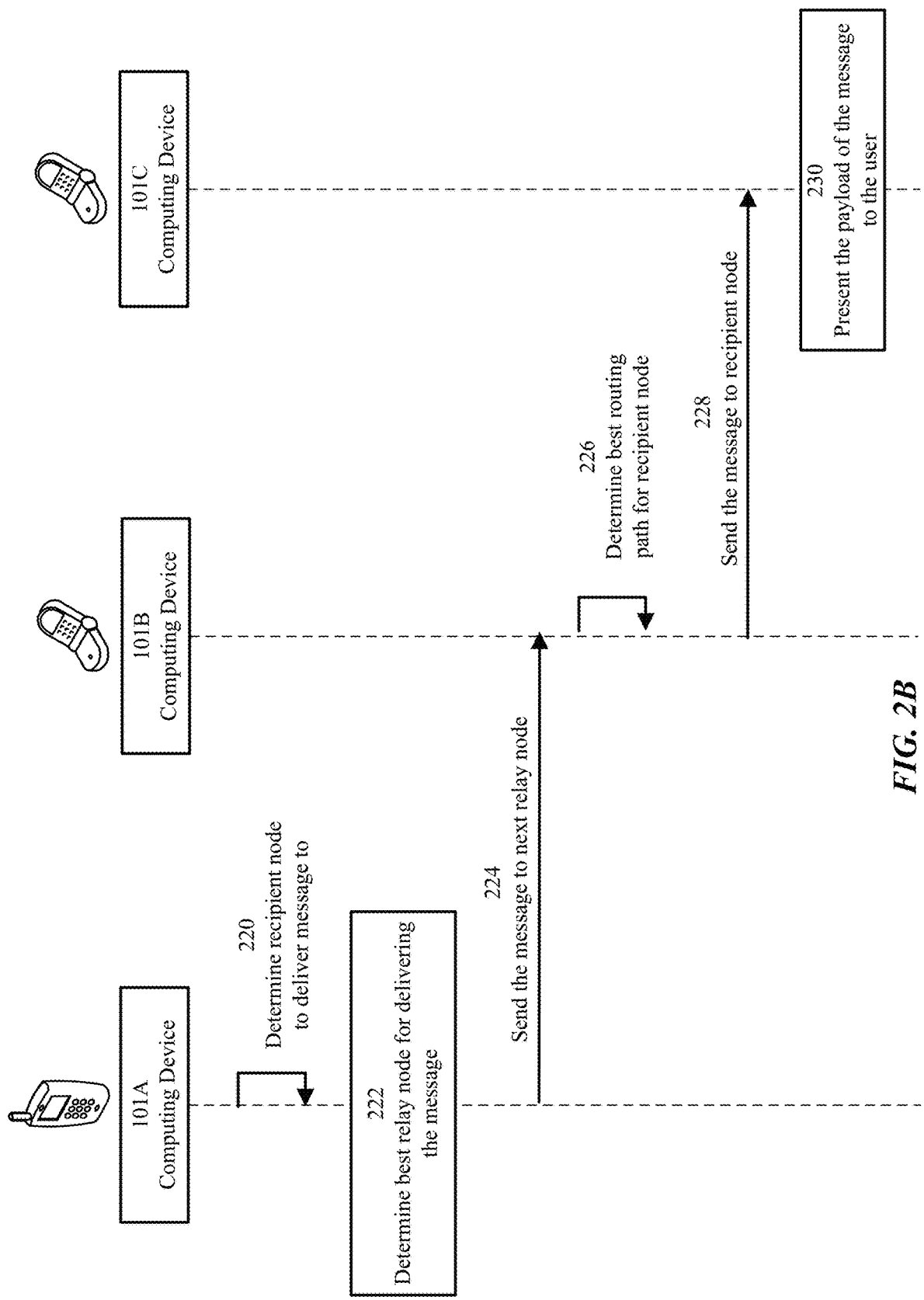

In particular embodiments, as discussed above, a message may be delivered through a multi-hop route using one or more relay nodes from the sender node to the recipient node. FIGS. 2A and 2B illustrate example flows for using the offline wireless mesh network. When a message is to be delivered through a multi-hop route, the message may be delivered in a stream mode where a routing path is pre-established before the message is sent from the sender. As an example and not by way of limitation, the computing device (e.g., associated with the social-networking system) may access the mesh network, determine a best multi-hop route of most efficiently sending a message from the sender node to the recipient node via one or more relay nodes based at least on the proximity information (e.g., based on geographic distance), client device information and network information before the message is sent, and then sending the message via the determined best multi-hop route. As shown in FIG. 2A, this process may include, at step 210, the computing device (e.g., associated with the social-networking system) first determining that the sender node (e.g., Computing Device 101A) is to deliver a message to the recipient node (e.g., computing device 101C), and then at step 212, determining the entire routing path of relay nodes for routing the message (e.g., pre-establishing the routing path). Then, at step 214, the message is sent to the relay node (e.g., computing device 101B), and at step 216, then sent from the relay node to the recipient node, where at step 218, the payload of the message is downloaded onto the user device and presented to the user associated with computing device 101C. In particular embodiments, the best multi-hop route for most efficiently sending a message may be determined in real time based on most recent proximity, client device information and network information. As another example and not by way of limitation, the message may be delivered in a real-time mode via the mesh network based on a real-time determination at each node of the best multi-hop route for most efficiently sending the message. In other words, the determination is updated at each relay node along a path based on the real time proximity, client device information and network information received at each node. This is due to the potentially constantly changing location and properties associated with each node (e.g., user mobile devices may be added or removed from the mesh network depending on the behavior and movement of the users, as described above). Each relay node that receives the message may then update the multi-hop route in real time so long as the relay node is not the final destination. As shown in FIG.

2B, this process may include, at step 220, the computing device (e.g., associated with the social-networking system) first determining that the sender node (e.g., computing device 101A) is to deliver a message to the recipient node (e.g., computing device 101C), then determining at step 222, the best relay node for delivering the message (e.g., the best next relay node as determined based on real-time conditions). At step 224, the computing device may send the message to the next relay node determined to be the best node option (e.g., computing device 101B), and then at step 226, the computing device (e.g., associated with the social-networking system) once again determining the best routing path to deliver the message to the recipient node. In this example, the best routing path is directly to the recipient node, but this disclosure contemplates the situation where the best routing path may include one or more additional relay nodes. At step 228, the message is sent from the relay node to the recipient node (computing device 101C), and at step 230, the payload of the message is downloaded onto the user device and presented to the user associated with computing device 101C. Although this disclosure describes sending and receiving communications within a wireless mesh network in a particular manner, this disclosure contemplates sending and receiving communications within a wireless mesh network in any suitable manner.

In particular embodiments, a node does not broadcast a message more than once in order to prevent message flooding. A node may choose between the stream mode and the real-time mode based on network information (e.g., message type and size, as discussed above), client device information (as discussed above), and proximity information (e.g., a threshold distance from the sender node or a relay, as discussed above). In particular embodiments, load levels of the nodes in the potential routing paths may be considered as well in determining the multi-hop route. In particular embodiments, a node may switch between the two connection modes in the middle of communication (i.e., in the middle of sending the message from the sender node to the recipient node).

Figure 3:
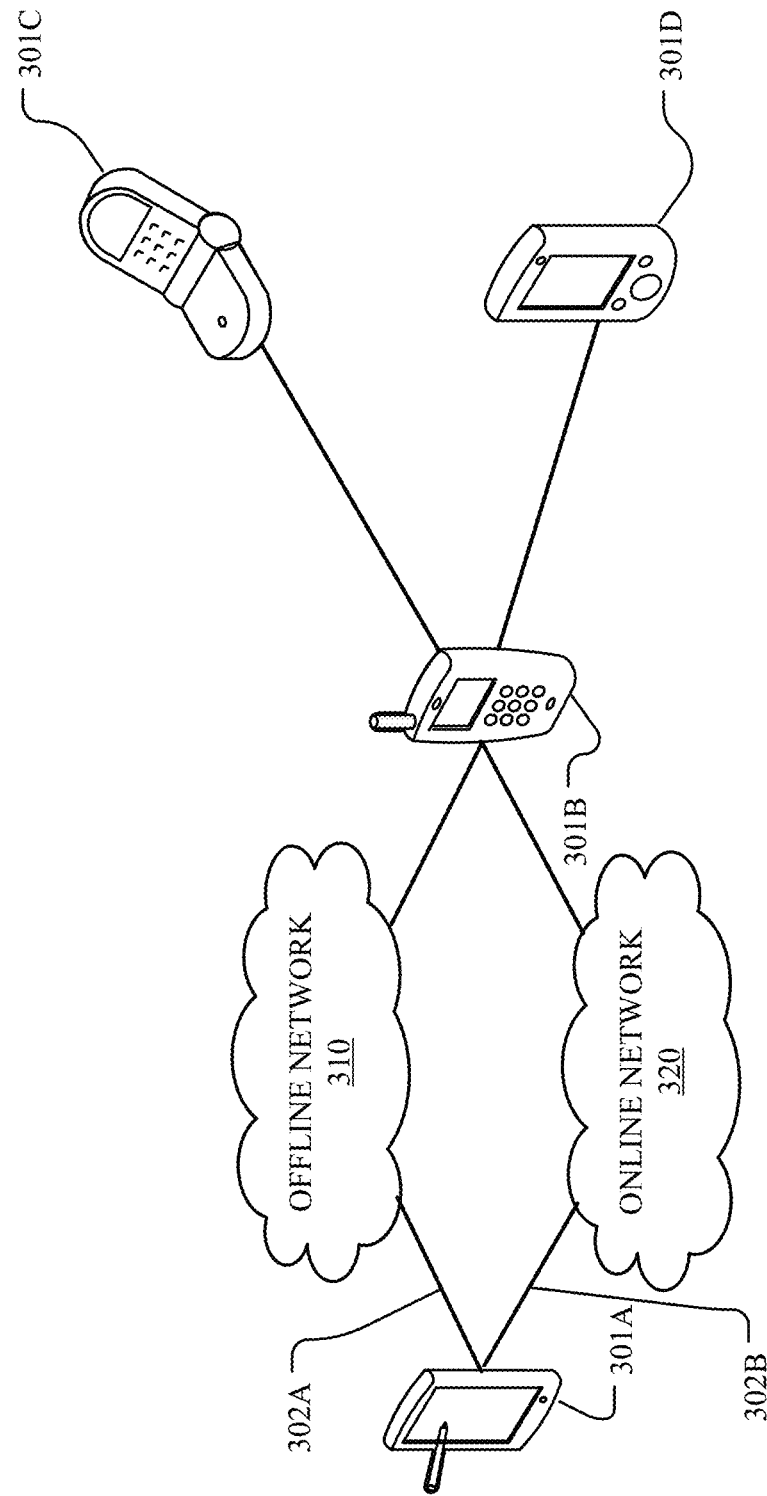
FIG. 3 illustrates an example network with online and offline capabilities.

In particular embodiments, a wireless mesh network may comprise one or more internet bridges that are connected to the Internet. FIG. 3 illustrates both an offline network and an online network. In particular embodiments, when one or more internet bridges are available in a mesh network, a sender node may calculate an estimated delivery delay and estimated reliability of each of the possible routing paths before making a decision whether to send a message over the Internet via one of the available bridges or to send the message through the nodes within the mesh network. As shown in FIG. 3, computing device 301A may connect to computing device 301B to send messages via offline network 310 without routing messages through the Internet (e.g., route 302A). Computing device 301B may then relay the message to computing device 301C, 301D, or both. In particular embodiments, when one or more internet bridges are available, computing device 301A may connect to computing device 301B to send messages via online network 320 by routing the messages through the Internet (e.g., route 302B). In particular embodiments, one or more participating computing devices may not be directly reachable via offline network 310. To communicate with those unreachable computing devices, computing devices having local communication paths may route messages through one or more devices connected to the Internet. The devices connected to the Internet may be referred to as back-haul points. A back-haul point may be one of the participating computing devices. In particular embodiments, a back-haul point may be a stationary infrastructure device including a Wi-Fi access point. Although this disclosure describes initiating offline and online communication sessions in a particular manner, this disclosure contemplates initiating offline and online communication session in any suitable manner.

Figure 4:
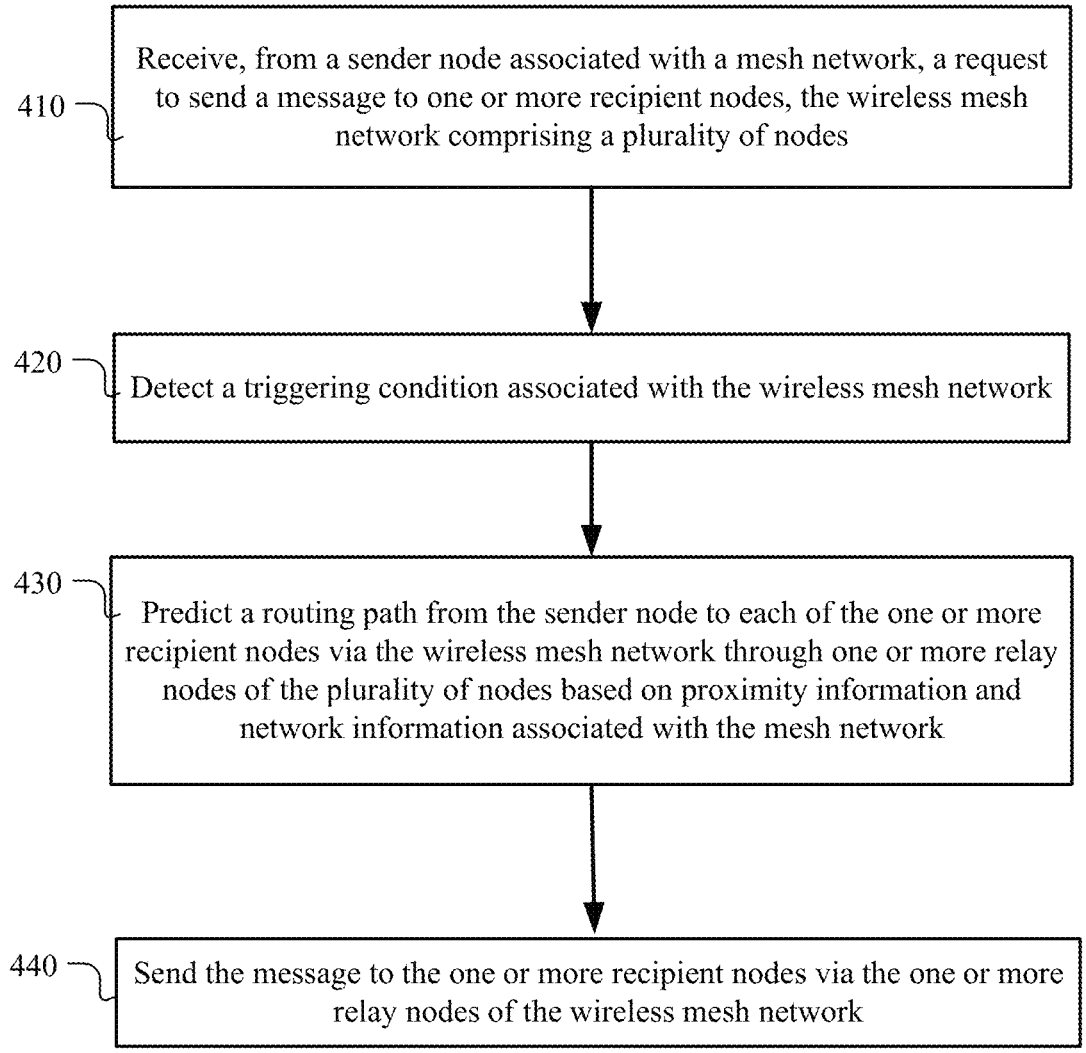
FIG. 4 illustrates an example method for sending messages via the wireless mesh network.

FIG. 4 illustrates an example method 400 for sending messages via the wireless mesh network. The method may begin at step 410, where a computing device (e.g., associated with the social-networking system) may receive, from a sender node associated with a mesh network, a request to send a message to one or more recipient nodes, the wireless mesh network comprising a plurality of nodes. At step 420, the computing device may detect a triggering condition associated with the wireless mesh network. At step 430, the computing device may predict a routing path from the sender node to each of the one or more recipient nodes via the wireless mesh network through one or more relay nodes of the plurality of nodes based on proximity information and network information associated with the mesh network. At step 440, the computing device may send the message to the one or more recipient nodes via the one or more relay nodes of the wireless mesh network. Particular embodiments may repeat one or more steps of the method of FIG. 4, where appropriate. In particular embodiments, the triggering condition may comprise determining that only offline communications via the wireless mesh network is accessible for the sender node or the one or more recipient nodes, and determining that at least one of the recipient nodes is not within a transmission range of the sender node. In particular embodiments, the triggering condition may comprise determining that a most efficient path to send the message comprises offline communications via the wireless mesh network based on proximity information associated with the sender node and each of the one or more recipient nodes. In particular embodiments, the predicting of the routing path from the sender node to each of the one or more recipient nodes via the wireless mesh network through the one or more relay nodes is determined based on at least one of a node identity associated with each of the one or more relay nodes, one or more node attributes associated with each of the one or more relay nodes, one or more message attributes associated with the message, or one or more network attributes associated with the wireless mesh network. In particular embodiments, the one or more nodes attributes includes at least one of an energy consumption of a client device associated with each of the one or more relay nodes, a reliability measure of message transmission to each of the one or more relay nodes, or a transmission signal power associated with each of the one or more relay nodes. In particular embodiments, the one or more message attributes includes a message type and a message size. In particular embodiments, the one or more network attributes includes at least one of messaging-time information, network-delay information, a total number of the one or more relay nodes, a sender-node distribution associated with the sender node, a recipient-node distribution associated with the recipient node, or a destination span associated with the routing path. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for sending messages via the wireless mesh network including the particular steps of the method of FIG. 4, this disclosure contemplates any suitable method for sending messages via the wireless mesh network including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
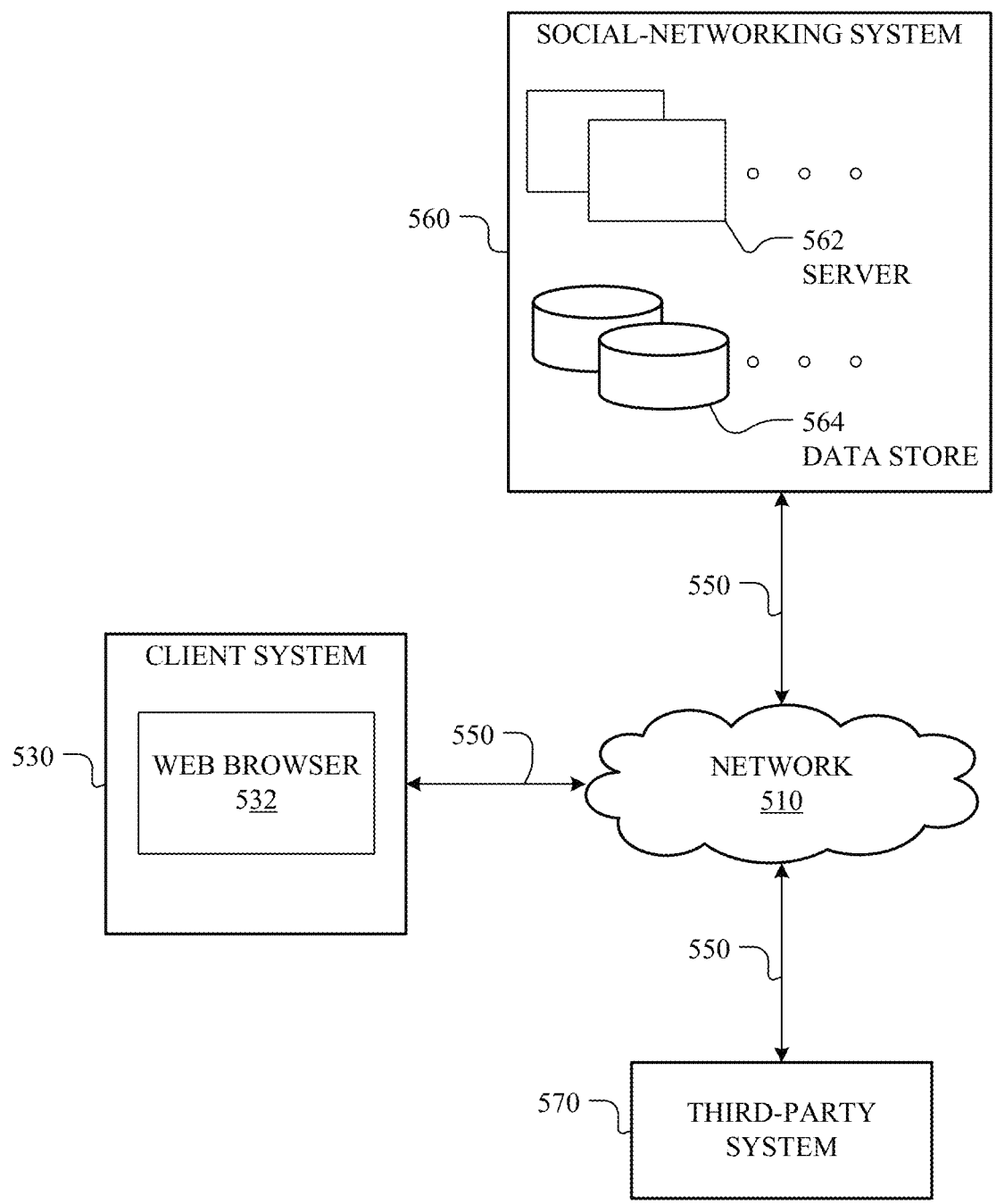
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via a network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
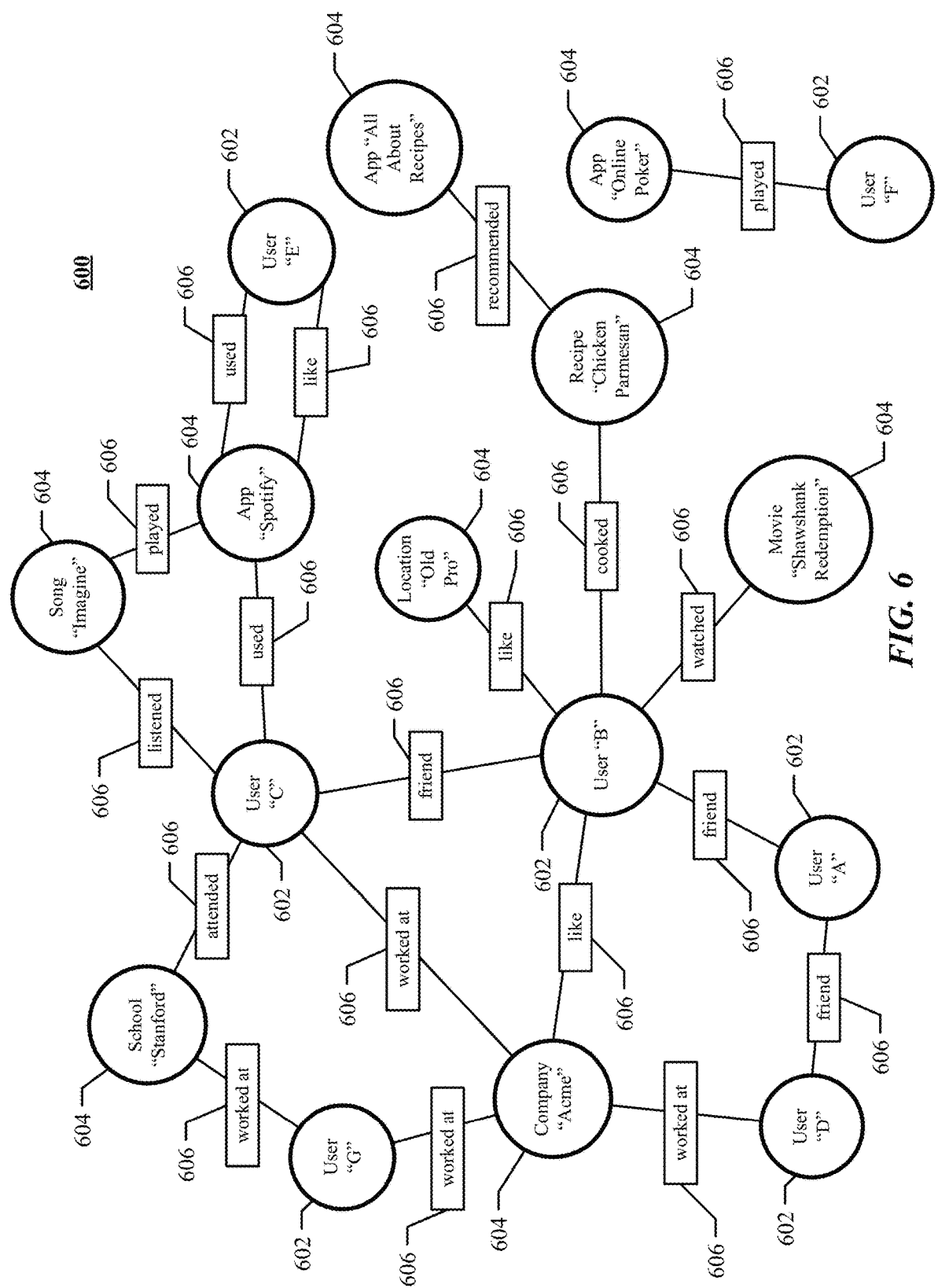
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with regis-tered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, social-networking system 560 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 560 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 560 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 560 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 560 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 560 may calculate a coefficient based on a user's actions. Social-networking system 560 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 560 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 560 may analyze a user's actions to determine whether one or more of the actions indicate an affinity for subject matter, content, other users, and so forth. As an example and not by way of limitation, if a user frequently posts content related to "coffee" or variants thereof, social-networking system 560 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 560 may calculate a coefficient based on the type of relationship between particular objects. Referencing the social graph 600, social-networking system 560 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 560 may determine that the user has a higher coefficient with respect to the first photo than the second photo because having a tagged-in-type relationship with content may be assigned a higher weight and/or rating than having a like-type relationship with content. In particular embodiments, social-networking system 560 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 560 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 560 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 530 of the user). A first user may be more interested in other users or concepts that are closer to the first user. As an example and not by way of limitation, if a user is one mile from an airport and two miles from a gas station, social-networking system 560 may determine that the user has a higher coefficient for the airport than the gas station based on the proximity of the airport to the user.

In particular embodiments, social-networking system 560 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 560 may provide information that is relevant to user's interests and current circumstances, increasing the likelihood that they will find such information of interest. In particular embodiments, social-networking system 560 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 560 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 560 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 560 may calculate the coefficient (or access the coefficient information if it has previously been calculated and stored). In particular embodiments, social-networking system 560 may measure an affinity with respect to a particular process. Different processes (both internal and external to the online social network) may request a coefficient for a particular object or set of objects. Social-networking system 560 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by social-networking system 560 or shared with other systems (e.g., third-party system 570). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 570, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 562 may be authorization/privacy servers for enforcing privacy settings. In response to a request from a user (or other entity) for a particular object stored in a data store 564, social-networking system 560 may send a request to the data store 564 for the object. The request may identify the user associated with the request and may only be sent to the user (or a client system 530 of the user) if the authorization server determines that the user is authorized to access the object based on the privacy settings associated with the object. If the requesting user is not authorized to access the object, the authorization server may prevent the requested object from being retrieved from the data store 564, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
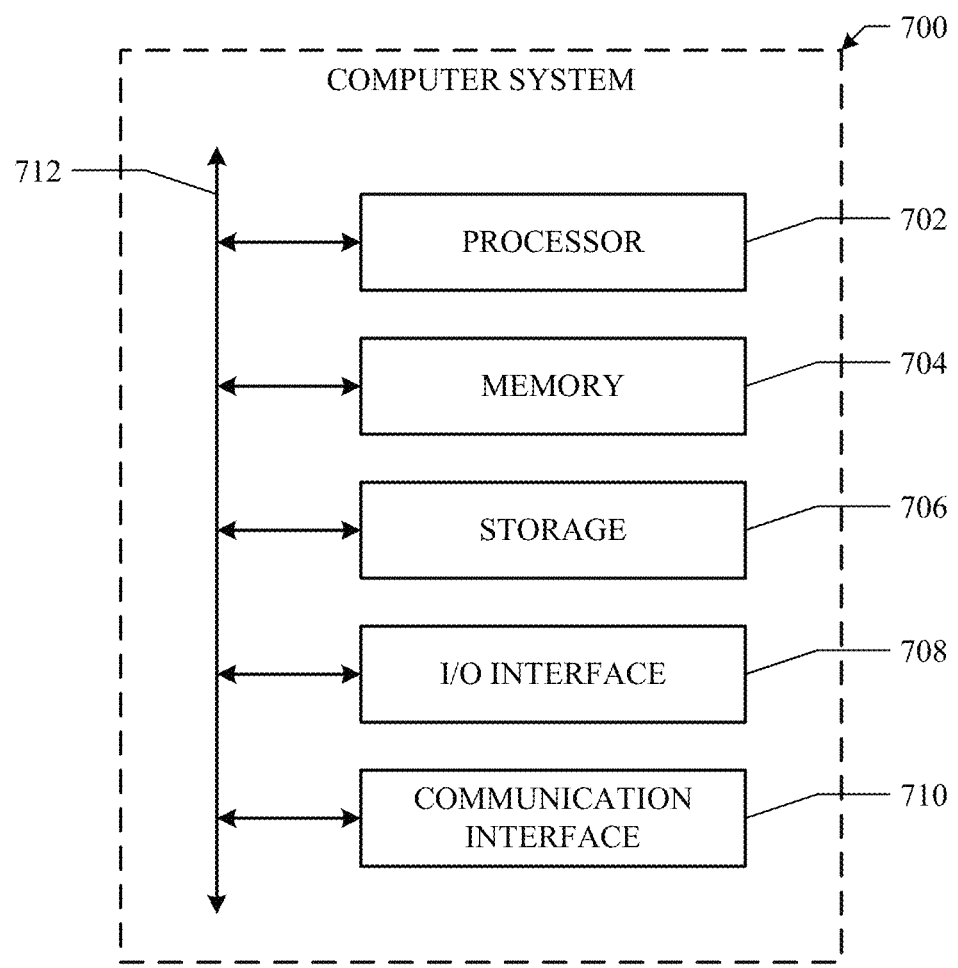
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706;

or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, receiving, from a sender node associated with a wireless mesh network, a request to send a message to one or more recipient nodes associated with the wireless mesh network, the wireless mesh network comprising a plurality of nodes, wherein one or more nodes of the plurality of nodes are associated with one or more users of an online social network, and wherein the sender node or the one or more recipient nodes are only accessible through offline communications via the wireless mesh network;
   by the computing device, detecting a triggering condition associated with the wireless mesh network;
   by the computing device, determining that one or more nodes of the plurality of nodes are back-haul points that are Internet-connected nodes;
   by the computing device, predicting a routing path from the sender node to each of the one or more recipient nodes via the wireless mesh network through one or more relay nodes of the plurality of nodes based on:
      proximity information and network information associated with the wireless mesh network and the one or more relay nodes; and
      relationships within the online social network between users associated with the one or more relay nodes and users associated with the sender node or the one or more recipient nodes,
   wherein at least one of the relay nodes is a back-haul point; and
   by the computing device, sending the message over the routing path to the one or more recipient nodes via the one or more relay nodes of the wireless mesh network.

2. The method of claim 1, wherein the triggering condition comprises:
   determining that only offline communications via the wireless mesh network are accessible for the sender node or the one or more recipient nodes, and
   determining that at least one of the recipient nodes is not within a transmission range of the sender node.

3. The method of claim 1, wherein the triggering condition comprises determining that a most efficient path to send the message comprises offline communications via the wireless mesh network based on proximity information associated with the sender node and each of the one or more recipient nodes.

4. The method of claim 1, wherein the predicting of the routing path from the sender node to each of the one or more recipient nodes via the wireless mesh network through the one or more relay nodes is determined based on one or more of:
   a node identity associated with each of the one or more relay nodes;
   one or more node attributes associated with each of the one or more relay nodes;
   one or more message attributes associated with the message; or
   one or more network attributes associated with the wireless mesh network.

5. The method of claim 4, wherein the computing device is associated with a social-networking system comprising a social graph that comprises a plurality of nodes and edges connecting the nodes, at least a first node of the social graph corresponding to the sender node, at least a second node of the social graph corresponds to the recipient node, and at least one or more third nodes of the social graph corresponds to each of the one or more relay nodes,
   wherein the node identity associated with each of the one or more relay nodes comprises a user associated with each of the relay nodes determined via the social graph, and
   wherein the predicting of the routing path is determined based on a relationship between the user associated with each of the relay nodes and the sender node or one or more recipient nodes based on information from the social graph of the social-networking system.

6. The method of claim 4, wherein the one or more node attributes associated with each of the one or more relay nodes comprises one or more of:
an energy consumption of a client device associated with each of the one or more relay nodes;
a reliability measure of message transmission to each of the one or more relay nodes; or
a transmission signal power associated with each of the one or more relay nodes.

7. The method of claim 4, wherein the one or more message attributes associated with the message comprises one or more of:
a message type, or
a message size.

8. The method of claim 4, wherein the one or more network attributes associated with the wireless mesh network comprises one or more of:
messaging-time information,
network-delay information,
a total number of the one or more relay nodes;
a sender-node distribution associated with the sender node,
a recipient-node distribution associated with the recipient node, or
a destination span associated with the routing path.

9. The method of claim 1, wherein the routing path is pre-established before the message is sent from the sender node to the recipient node.

10. The method of claim 1, wherein the routing path is determined at each of the one or more relay nodes as the message is sent from the sender node to the recipient node.

11. The method of claim 1, further comprising:
determining that only offline communications via the wireless mesh network are accessible for one or more nodes of the plurality of nodes.

12. The method of claim 1, wherein predicting the routing path comprises predicting a best routing path to deliver the message to the recipient node.

13. The method of claim 12, wherein the best routing path comprises a best multi-hop route for most efficiently sending the message.

14. One or more computer-readable non-transitory storage media embodying software that is operable when executed to:
receive, from a sender node associated with a wireless mesh network, a request to send a message to one or more recipient nodes associated with the wireless mesh network, the wireless mesh network comprising a plurality of nodes, wherein one or more nodes of the plurality of nodes are associated with one or more users of an online social network, and wherein the sender node or the one or more recipient nodes are only accessible through offline communications via the wireless mesh network;
detect a triggering condition associated with the wireless mesh network;
determine that one or more nodes of the plurality of nodes are back-haul points that are Internet-connected nodes;
predict a routing path from the sender node to each of the one or more recipient nodes via the wireless mesh network through one or more relay nodes of the plurality of nodes based on:
proximity information and network information associated with the wireless mesh network and the one or more relay nodes; and
relationships within the online social network between users associated with the one or more relay nodes and users associated with the sender node or the one or more recipient nodes,
wherein at least one of the relay nodes is a back-haul point; and
send the message over the routing path to the one or more recipient nodes via the one or more relay nodes of the wireless mesh network.

15. The media of claim 14, wherein the triggering condition comprises:
determining that only offline communications via the wireless mesh network are accessible for the sender node or the one or more recipient nodes, and
determining that at least one of the recipient nodes is not within a transmission range of the sender node.

16. The media of claim 14, wherein the triggering condition comprises determining that a most efficient path to send the message comprises offline communications via the wireless mesh network based on proximity information associated with the sender node and each of the one or more recipient nodes.

17. The media of claim 14, wherein the routing path is pre-established before the message is sent from the sender node to the recipient node.

18. The media of claim 14, wherein the routing path is determined at each of the one or more relay nodes as the message is sent from the sender node to the recipient node.

19. A system comprising: one or more processors; and one or more computer-readable non-transitory storage media coupled to one or more of the processors and comprising instructions operable when executed by one or more of the processors to cause the system to:
receive, from a sender node associated with a wireless mesh network, a request to send a message to one or more recipient nodes associated with the wireless mesh network, the wireless mesh network comprising a plurality of nodes, wherein one or more nodes of the plurality of nodes are associated with one or more users of an online social network, and wherein the sender node or the one or more recipient nodes are only accessible through offline communications via the wireless mesh network;
detect a triggering condition associated with the wireless mesh network;
determine that one or more nodes of the plurality of nodes are back-haul points that are Internet-connected nodes;
predict a routing path from the sender node to each of the one or more recipient nodes via the wireless mesh network through one or more relay nodes of the plurality of nodes based on:
proximity information and network information associated with the wireless mesh network and the one or more relay nodes; and
relationships within the online social network between users associated with the one or more relay nodes and users associated with the sender node or the one or more recipient nodes,
wherein at least one of the relay nodes is a back-haul point; and
send the message over the routing path to the one or more recipient nodes via the one or more relay nodes of the wireless mesh network.

20. The system of claim 19, wherein the triggering condition comprises:
   determining that only offline communications via the wireless mesh network are accessible for the sender node or the one or more recipient nodes, and
   determining that at least one of the recipient nodes is not within a transmission range of the sender node.

21. The system of claim 19, wherein the triggering condition comprises determining that a most efficient path to send the message comprises offline communications via the wireless mesh network based on proximity information associated with the sender node and each of the one or more recipient nodes.

22. The system of claim 19, wherein the routing path is pre-established before the message is sent from the sender node to the recipient node.

23. The system of claim 19, wherein the routing path is determined at each of the one or more relay nodes as the message is sent from the sender node to the recipient node.

\* \* \* \* \*